US012583267B2

(12) United States Patent
Ichikawa

(10) Patent No.: US 12,583,267 B2
(45) Date of Patent: Mar. 24, 2026

(54) TIRE STATE MONITORING SYSTEM AND TIRE STATE MONITORING METHOD

(71) Applicant: BRIDGESTONE CORPORATION, Tokyo (JP)

(72) Inventor: Hiromitsu Ichikawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 388 days.

(21) Appl. No.: 18/259,483

(22) PCT Filed: Nov. 30, 2021

(86) PCT No.: PCT/JP2021/043970
§ 371 (c)(1),
(2) Date: Jun. 27, 2023

(87) PCT Pub. No.: WO2022/158125
PCT Pub. Date: Jul. 28, 2022

(65) Prior Publication Data
US 2024/0059109 A1 Feb. 22, 2024

(30) Foreign Application Priority Data

Jan. 19, 2021 (JP) ................................. 2021-006697

(51) Int. Cl.
B60C 23/04 (2006.01)
(52) U.S. Cl.
CPC ................................. B60C 23/0476 (2013.01)
(58) Field of Classification Search
CPC ................................................. B60C 23/0476
See application file for complete search history.

(56) References Cited

U.S. PATENT DOCUMENTS

| | | | |
|---|---|---|---|
| 7,209,855 B2 | 4/2007 | Fabre et al. | |
| 7,437,922 B2 | 10/2008 | Bougeard et al. | |
| 7,594,433 B2 | 9/2009 | Bondu | |
| 10,675,925 B1 | 6/2020 | Oakes, III et al. | |
| 11,420,485 B2 | 8/2022 | Greco et al. | |

(Continued)

FOREIGN PATENT DOCUMENTS

| | | |
|---|---|---|
| JP | 2005-212669 A | 8/2005 |
| JP | 2006-071642 A | 3/2006 |

(Continued)

OTHER PUBLICATIONS

Extended European Search Report issued Mar. 13, 2024 in Application No. 21921227.1.

(Continued)

*Primary Examiner* — Jennifer Bahls
(74) *Attorney, Agent, or Firm* — Sughrue Mion, PLLC

(57) ABSTRACT

A tire state monitoring system comprises an acquisition device and a control device. The acquisition device is configured to repeatedly acquire a pressure and temperature inside a tire. The control device is configured to: calculate, based on ratios between the pressure and temperature acquired in a first period, a representative value of the ratios in the first period; and compare a ratio between the pressure and temperature acquired in a second period after the first period with the representative value, to determine whether the pressure inside the tire has dropped.

20 Claims, 6 Drawing Sheets

(56)　　　　　　References Cited

U.S. PATENT DOCUMENTS

| | | | |
|---|---|---|---|
| 2013/0274988 A1 * | 10/2013 | Reynes | B60C 23/0408 |
| | | | 701/29.4 |
| 2016/0229235 A1 | 8/2016 | Saint-Loup et al. | |
| 2020/0189533 A1 * | 6/2020 | Lin | B60C 23/10 |

FOREIGN PATENT DOCUMENTS

| | | |
|---|---|---|
| JP | 2007-196999 A | 8/2007 |
| JP | 2007-326558 A | 12/2007 |
| JP | 2010-254018 A | 11/2010 |
| JP | 2012-237629 A | 12/2012 |
| JP | 2016-537228 A | 12/2016 |
| WO | 2019/092352 A1 | 5/2019 |

OTHER PUBLICATIONS

International Preliminary Report on Patentability (with translation of Written Opinion) dated Jul. 20, 2023 in Application No. PCT/JP2021/043970.

International Search Report for PCT/JP2021/043970 dated Feb. 22, 2022.

* cited by examiner

2

TIRE STATE MONITORING SYSTEM AND TIRE STATE MONITORING METHOD

CROSS REFERENCE TO RELATED APPLICATIONS

This application is a National Stage of International Application No. PCT/JP2021/043970 filed Nov. 30, 2021, claiming priority based on Japanese Patent Application No. 2021-006697 filed Jan. 19, 2021.

TECHNICAL FIELD

The present disclosure relates to a tire state monitoring system and a tire state monitoring method.

BACKGROUND

Tire state monitoring systems are conventionally known that monitor the tire state based on information acquired by a sensor installed in the tire. Techniques of, in such systems, improving the accuracy of determining a pressure drop inside the tire using the temperature inside the tire are known. For example, JP 2010-254018 A (PTL 1) discloses a tire air pressure monitoring system that detects an air pressure drop inside a tire based on a threshold of air pressure set for each temperature inside the tire.

CITATION LIST

Patent Literature

PTL 1: JP 2010-254018 A

SUMMARY

Technical Problem

With the conventional techniques, however, the temperature inside the tire cannot be accurately acquired depending on, for example, the installation position of the sensor in the tire. In such a case, it may be impossible to appropriately determine a pressure drop inside the tire using the temperature inside the tire.

It could therefore be helpful to provide a tire state monitoring system and tire state monitoring method that can improve the accuracy of determining a pressure drop inside a tire.

Solution to Problem

A tire state monitoring system according to the present disclosure comprises an acquisition device and a control device. The acquisition device is configured to repeatedly acquire a pressure and temperature inside a tire, and the control device is configured to: calculate, based on ratios between the pressure and temperature acquired in a first period, a representative value of the ratios in the first period; and compare a ratio between the pressure and temperature acquired in a second period after the first period with the representative value, to determine whether the pressure inside the tire has dropped.

A tire state monitoring method according to the present disclosure comprises: repeatedly acquiring a pressure and temperature inside a tire; calculating, based on ratios between the pressure and temperature acquired in a first period, a representative value of the ratios in the first period;

and comparing a ratio between the pressure and temperature acquired in a second period after the first period with the representative value, to determine whether the pressure inside the tire has dropped.

Advantageous Effect

It is thus possible to provide a tire state monitoring system and tire state monitoring method that can improve the accuracy of determining a pressure drop inside a tire.

DETAILED DESCRIPTION

Figure 1:
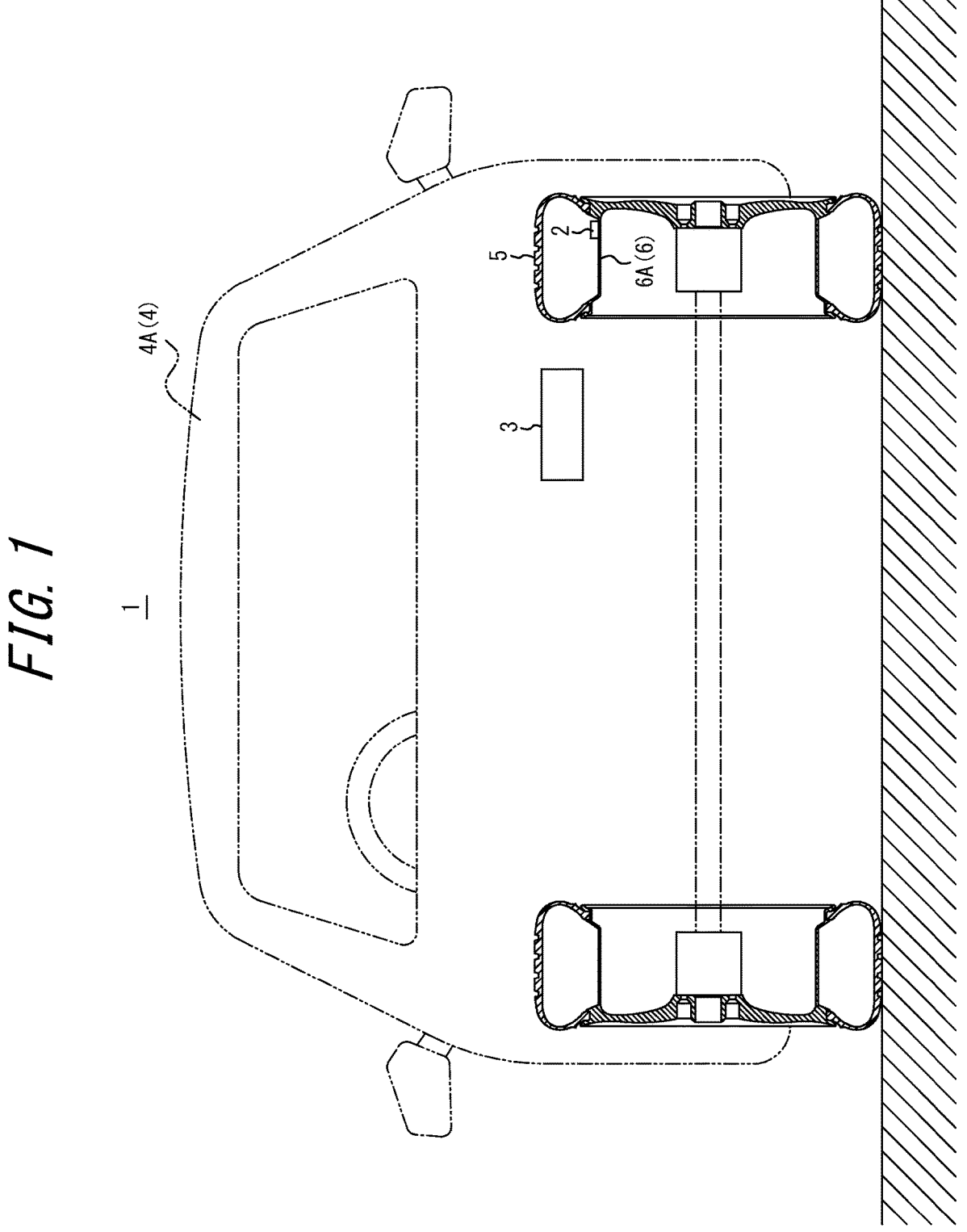
FIG. 1 is a schematic diagram illustrating a tire state monitoring system according to an embodiment of the present disclosure.

An embodiment of the present disclosure will be described below with reference to the drawings. In the drawings, the same or corresponding parts are given the same reference signs. In the following description of this embodiment, the description of the same or corresponding parts is omitted or simplified as appropriate.

(Structure of Tire State Monitoring System)

An outline of a tire state monitoring system 1 according to an embodiment of the present disclosure will be described below with reference to FIG. 1. FIG. 1 is a schematic diagram illustrating the tire state monitoring system 1 according to this embodiment. The tire state monitoring system 1 includes an acquisition device 2 and a control device 3.

The tire state monitoring system 1 is used to monitor the state of a tire 5 of a vehicle 4. In this embodiment, the state of the tire 5 includes the pressure inside the tire 5. The state of the tire 5 is, however, not limited to the pressure inside the tire 5, and may include the temperature of the tire 5, whether the tire 5 has damage or strain, etc.

The vehicle 4 is, for example, an automobile such as a passenger vehicle, a truck, a bus, or a two-wheeled vehicle. The vehicle 4 is not limited to automobiles, and may be any vehicle 4 having the tire 5.

The tire 5 is, for example, a pneumatic tire. In this case, the tire 5 is mounted on a rim 6A of a wheel 6 and filled with air to a prescribed internal pressure. The tire 5 is not limited to pneumatic tires, and may be filled with any fluid, including gas such as nitrogen or liquid or gel-like substance, to a prescribed internal pressure.

The acquisition device 2 is installed at a position where the pressure and temperature inside the tire 5 can be acquired. In this embodiment, the acquisition device 2 is installed on the rim 6A of the wheel 6 of the vehicle 4. For example, the acquisition device 2 is fixed to the wheel radial outer side of the rim 6A of the wheel 6 by a belt or the like so as to face the inner space of the tire 5 when the tire 5 is mounted on the rim 6A of the wheel 6. In this specification, the wheel radial direction denotes a direction orthogonal to the rotation axis of the wheel 6. The side closer to the rotation axis of the wheel 6 in the wheel radial direction is referred to as the "wheel radial inner side", and the side farther from the rotation axis of the wheel 6 in the wheel radial direction is referred to as the "wheel radial outer side".

The acquisition device 2 repeatedly acquires the pressure and temperature inside the tire 5 and transmits them wirelessly. The acquisition device 2 may operate in a plurality of operation modes. For example, the plurality of operation modes include a normal mode in which the pressure and temperature inside the tire 5 are repeatedly transmitted in a situation where the state of the tire 5 is likely to change, such as when the vehicle 4 is running, and a power saving mode in which the pressure and temperature inside the tire 5 are transmitted at longer time intervals than in the normal mode in a situation where the state of the tire 5 is unlikely to change, such as when the vehicle 4 is stopped. Changing the operation mode of the acquisition device 2 can change the time intervals at which the acquisition device 2 acquires and transmits the pressure and temperature inside the tire 5.

The control device 3 is installed in the vehicle body 4A of the vehicle 4. The control device 3 may be any computer installed in the vehicle 4, such as an electronic control unit (ECU) or a car navigation system of the vehicle 4.

The control device 3 receives the pressure and temperature inside the tire 5 transmitted from the acquisition device 2, and determines whether the pressure inside the tire 5 has dropped based on the ratio between the received pressure and temperature inside the tire 5.

Specifically, the fact that the pressure and temperature inside the tire 5 follow the Boyle-Charles's relational formula is used in the determination of whether the pressure inside the tire 5 has dropped. The Boyle-Charles's relational formula is represented by the following formula (1):

$$PV=kT \qquad\qquad \text{formula (1)}$$

where P is the absolute pressure (gauge pressure+100 kPa), V is the volume, k is a constant, and T is the absolute temperature (Celsius+273° C.).

According to the Boyle-Charles's relational formula, assuming that the volume of the fluid inside the tire 5 is constant, the ratio between the pressure and temperature inside the tire 5 can be regarded as being constant. Under this assumption, the control device 3 determines whether the pressure inside the tire 5 has dropped based on the ratio between the pressure and temperature inside the tire 5.

The position and number of each of the acquisition device 2, the control device 3, the tire 5, and the wheel 6 in the vehicle 4 illustrated in FIG. 1 are an example, and may be freely set according to the use, etc. For example, a plurality of acquisition devices 2 may be included in the tire state monitoring system 1 according to the number of tires 5 included in the vehicle 4.

Next, the acquisition device 2 and the control device 3 in the tire state monitoring system 1 will be described in detail below.

(Structure of Acquisition Device)

Figure 2:
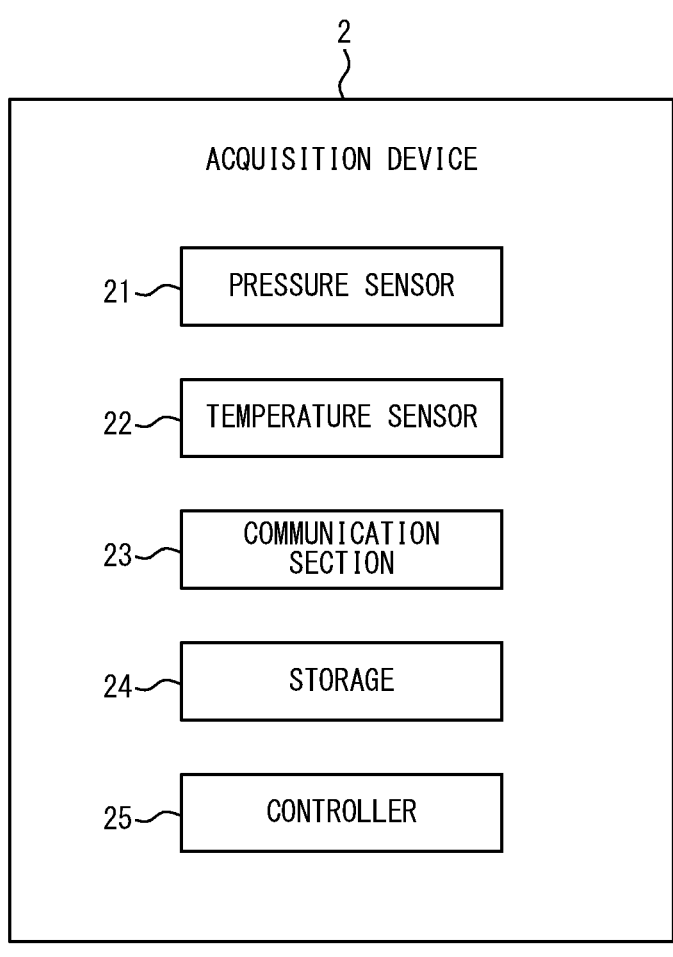
FIG. 2 is a functional block diagram schematically illustrating the structure of an acquisition device in FIG. 1.

The structure of the acquisition device 2 according to this embodiment will be described below with reference to FIG. 2. FIG. 2 is a functional block diagram schematically illustrating the structure of the acquisition device 2. As illustrated in FIG. 2, the acquisition device 2 includes a pressure sensor 21, a temperature sensor 22, a communication section 23, a storage 24, and a controller 25. The pressure sensor 21, the temperature sensor 22, the communication section 23, the storage 24, and the controller 25 are connected by wire or wirelessly so as to be communicable with each other.

The pressure sensor 21 acquires the pressure inside the tire 5. In the case where the tire 5 is a pneumatic tire, the pressure sensor 21 acquires the air pressure inside the air chamber of the tire 5.

The temperature sensor 22 acquires the temperature inside the tire 5. In the case where the tire 5 is a pneumatic tire, the temperature sensor 22 acquires the temperature inside the air chamber of the tire 5.

The communication section 23 includes one or more wireless communication modules. Examples of the wireless communication modules include communication modules compliant with communication standards such as wireless local area network (LAN) and Bluetooth® (Bluetooth is a registered trademark in Japan, other countries, or both). Thus, the acquisition device 2 can wirelessly communicate with the control device 3 and the like via the communication section 23. The communication section 23 may include a wired communication module such as a wired LAN communication module in addition to the wireless communication module.

The storage 24 is, for example, semiconductor memory, magnetic memory, or optical memory. The storage 24 may function, for example, as a main storage device, an auxiliary storage device, or cache memory. The storage 24 stores any information used for the operation of the acquisition device 2. For example, the storage 24 may store system programs, application programs, embedded software, etc.

The controller 25 includes one or more processors. Examples of the processors include general-purpose processors such as a central processing unit (CPU) and dedicated processors specialized for specific processing. The controller 25 is not limited to processors, and may include one or more dedicated circuits. Examples of the dedicated circuits include a field-programmable gate array (FPGA) and an application specific integrated circuit (ASIC).

The controller 25 controls components such as the pressure sensor 21, the temperature sensor 22, the communication section 23, and the storage 24 in order to achieve the foregoing functions of the acquisition device 2. The controller 25 includes, as a function of the acquisition device 2, a clocking function such as a real-time clock (RTC) or a timer in order to acquire the time at which the process is performed or to perform the process at predetermined time intervals.

Figure 3:
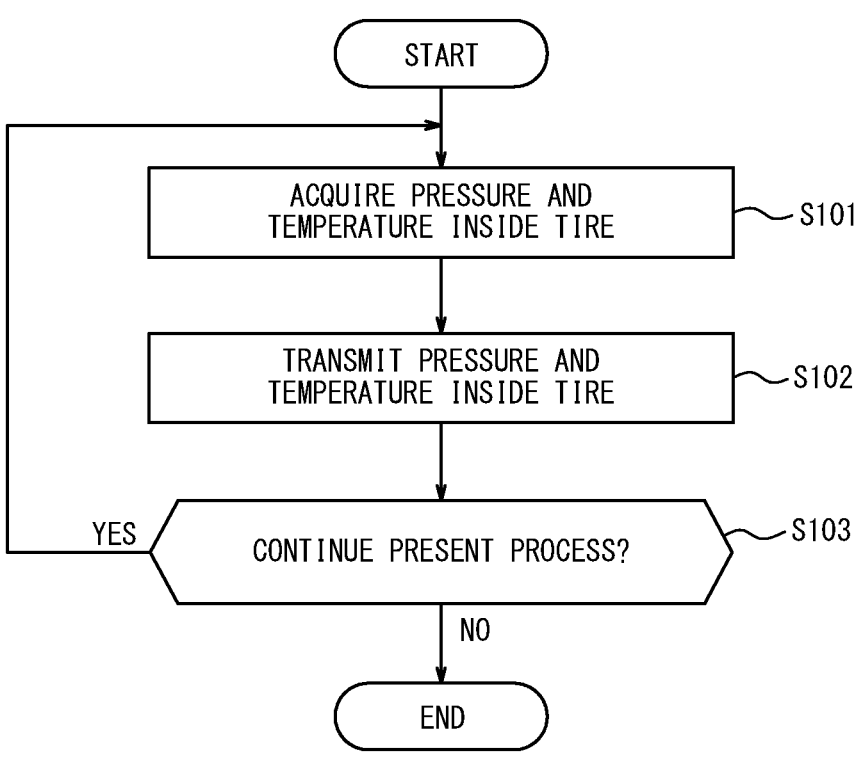
FIG. 3 is a flowchart illustrating the operation of the acquisition device.

The operation of the acquisition device 2 achieved by the controller 25 controlling each function of the acquisition device 2 will be described below with reference to FIG. 3. FIG. 3 is a flowchart illustrating the operation of the acquisition device 2. This operation corresponds to the method implemented using the acquisition device 2 in the tire state monitoring method. The controller 25 starts the present process, for example, when the acquisition device 2 is powered on or when a control instruction to start the present process is received from the control device 3.

In step S101, the controller 25 acquires the pressure and temperature inside the tire 5.

Specifically, the controller 25 acquires the pressure inside the tire 5 by the pressure sensor 21, and acquires the temperature inside the tire 5 by the temperature sensor 22. The controller 25 may store the acquired pressure and temperature inside the tire 5 in the storage 24 in association with the acquisition time of the pressure and temperature.

In step S102, the controller 25 transmits the acquired pressure and temperature inside the tire 5.

Specifically, the controller 25 controls the communication section 23 to transmit acquisition data including the acquired pressure and temperature inside the tire 5. The acquisition data may include, in addition to the pressure and temperature inside the tire 5, the acquisition time of the pressure and temperature.

In step S103, the controller 25 determines whether to continue the present process.

For example, the controller 25 can determine whether to continue the present process depending on whether the acquisition device 2 is powered off or whether a control instruction to end the present process is received from the control device 3. In the case where the controller 25 determines to continue the present process (step S103: Yes), the controller 25 repeats the present process from step S101 at predetermined time intervals. The predetermined time intervals are, for example, 5 minute intervals or 10 minute intervals. The predetermined time intervals may vary depending on the operation mode of the acquisition device 2 described above. For example, the controller 25 may determine the operation mode of the acquisition device 2 based on a control instruction received from the control device 3, and repeat the present process at the time intervals that correspond to the operation mode.

The predetermined time intervals are not limited to the foregoing examples, and may be determined freely. For example, the predetermined time intervals may be determined according to a determination cycle in which the control device 3 determines whether the pressure inside the tire 5 has dropped (described in detail later). For example, in determination of a slow leak, which is a long-term pressure drop inside the tire 5, the determination cycle may be lengthened, and the predetermined time intervals may be lengthened accordingly. For example, in the case where the determination cycle is one month, the predetermined time intervals may be six hour intervals. Thus, the power consumption of the acquisition device 2 can be saved while data of a sufficient number of samples, e.g. at least 100 samples, can be acquired in each determination cycle.

In the case where the controller 25 determines not to continue the present process (step S103: No), the controller 25 ends the present process.

(Structure of Control Device)

Figure 4:
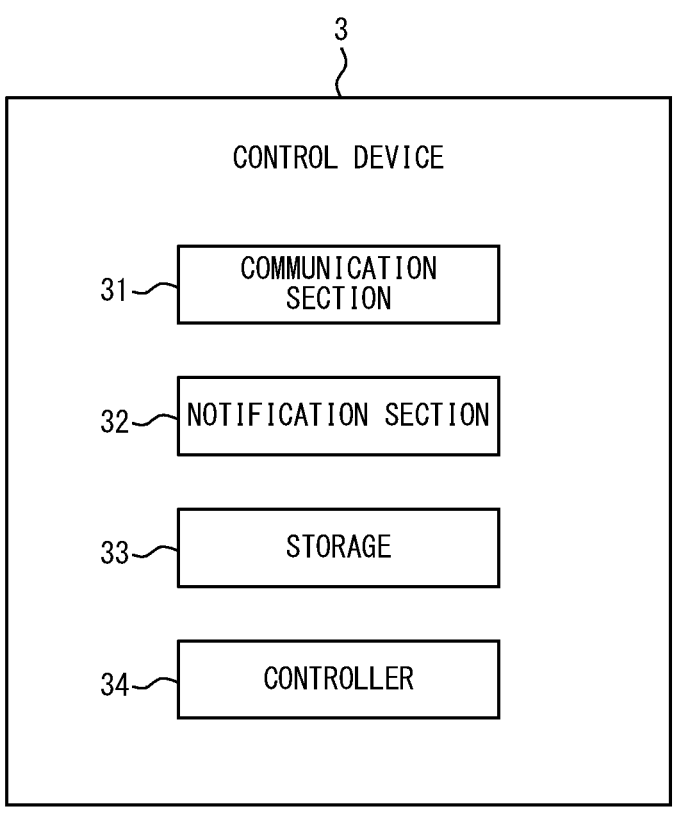
FIG. 4 is a functional block diagram schematically illustrating the structure of a control device in FIG. 1.

The structure of the control device 3 according to this embodiment will be described below with reference to FIG. 4. FIG. 4 is a functional block diagram schematically illustrating the structure of the control device 3. As illustrated in FIG. 4, the control device 3 includes a communication section 31, a notification section 32, a storage 33, and a controller 34. The communication section 31, the notification section 32, the storage 33, and the controller 34 are connected by wire or wirelessly so as to be communicable with each other.

The communication section 31 includes one or more wireless communication modules. Examples of the wireless communication modules include communication modules compliant with communication standards such as wireless LAN and Bluetooth. Thus, the control device 3 can wirelessly communicate with the acquisition device 2 and the like via the communication section 31. The communication section 31 may include a wired communication module such as a wired LAN communication module in addition to the wireless communication module.

The notification section 32 notifies information by image, sound, vibration, or the like. The notification section 32 may include, for example, a display, a speaker, or a vibrator.

The storage 33 is, for example, semiconductor memory, magnetic memory, or optical memory. The storage 33 may function, for example, as a main storage device, an auxiliary storage device, or cache memory. The storage 33 stores any information used for the operation of the control device 3. For example, the storage 33 may store system programs, application programs, embedded software, etc.

The controller 34 includes one or more processors. Examples of the processors include general-purpose processors such as a CPU and dedicated processors specialized for specific processing. The controller 34 is not limited to processors, and may include one or more dedicated circuits. Examples of the dedicated circuits include an FPGA and an ASIC.

The controller 34 controls components such as the communication section 31, the notification section 32, and the storage 33 in order to achieve the foregoing functions of the control device 3. The controller 34 includes, as a function of the control device 3, a clocking function such as a real-time clock (RTC) or a timer in order to acquire the time at which the process is performed or to perform the process at predetermined time intervals.

Figure 5:
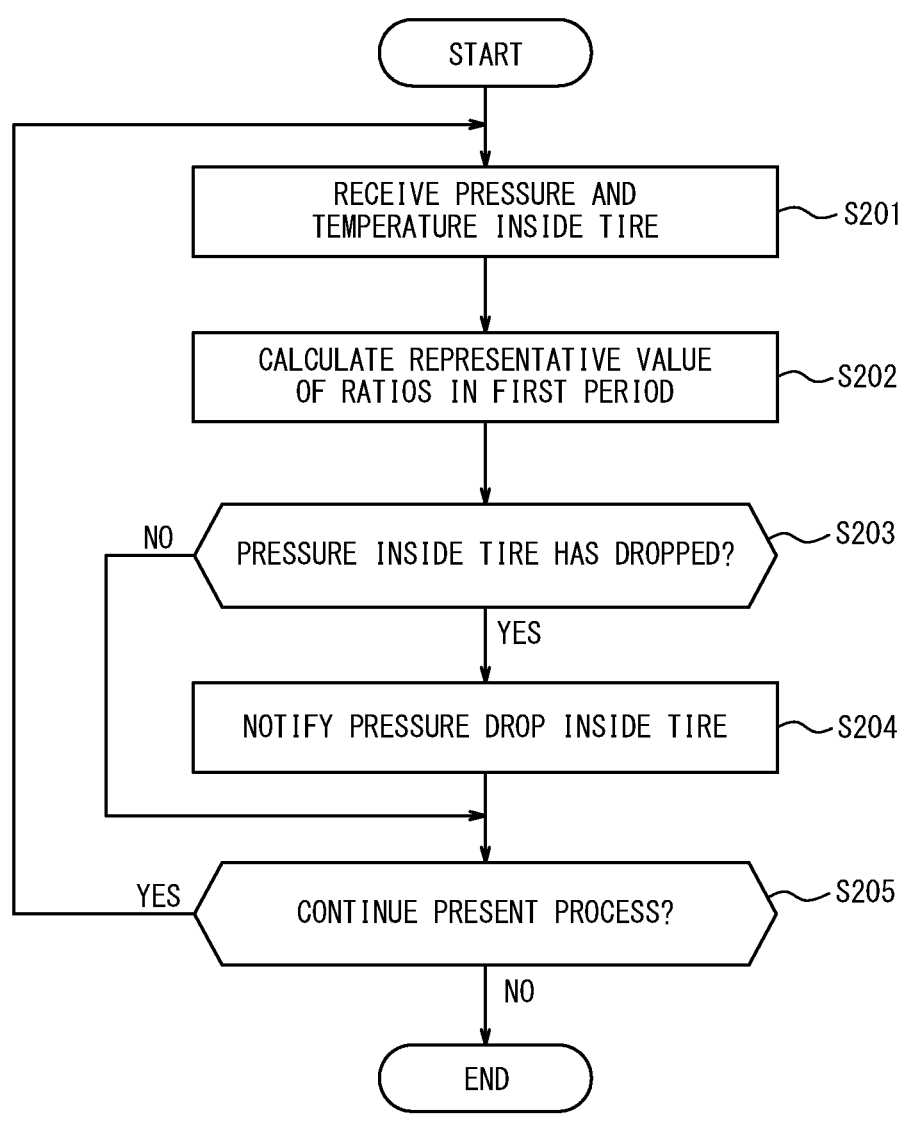
FIG. 5 is a flowchart illustrating the operation of the control device.

The operation of the control device 3 achieved by the controller 34 controlling each function of the control device 3 will be described below with reference to FIG. 5. FIG. 5 is a flowchart illustrating the operation of the control device 3. This operation corresponds to the method implemented using the control device 3 in the tire state monitoring method.

The controller 34 repeatedly performs this operation in each predetermined determination cycle to determine whether the pressure inside the tire 5 has dropped. In the description of this operation, after a first period (past determination cycle) ends, the controller 34 determines, in a second period (current determination cycle) after the first period, whether the pressure inside the tire 5 has dropped using information acquired in the first period. The lengths of the first period and the second period are, for example, one month. The first period and the second period may be temporally continuous with each other, or may be temporally discrete.

In step S201, the controller 34 receives the pressure and temperature inside the tire 5.

Specifically, the controller 34 receives acquisition data including the pressure and temperature inside the tire 5 from the acquisition device 2 via the communication section 31. In the case where the acquisition data includes the acquisition time of the pressure and temperature, the controller 34 stores the pressure, the temperature, and the acquisition time in the storage 33 as one of the sets of acquisition data acquired in the second period. In the case where the acquisition data does not include the acquisition time, the controller 34 may set the time at which the acquisition data is received as the acquisition time, and store the pressure, the temperature, and the acquisition time in the storage 33 as one set of acquisition data acquired in the second period.

In step S202, the controller 34 calculates, based on the ratios between the pressure and temperature inside the tire 5 acquired in the first period, a representative value of the ratios in the first period.

Specifically, the controller 34 calculates the ratio between the pressure and temperature included in each of a plurality of sets of acquisition data acquired in the first period. In this embodiment, the ratio between pressure and temperature is the ratio of pressure to temperature, and is represented by the following formula (2):

$$R_{PT} = P/T \qquad \text{formula (2)}$$

where $R_{PT}$ is the ratio between pressure and temperature (ratio of pressure to temperature), P is the absolute pressure (gauge pressure+100 kPa), and T is the absolute temperature (Celsius+273° C.).

Figure 6:
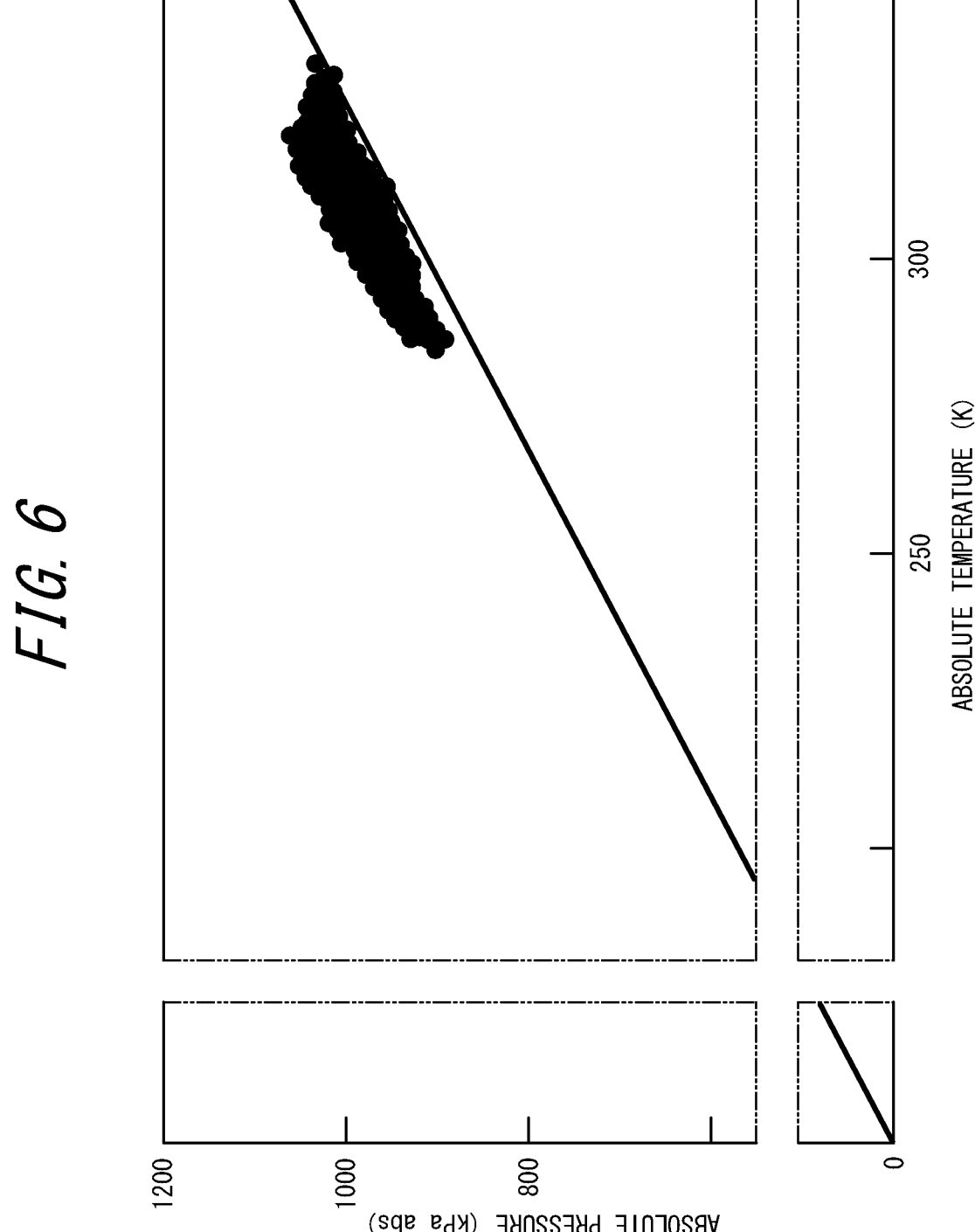
FIG. 6 is an example of a scatter diagram of temperature and pressure inside a tire acquired in a first period.

The controller 34 calculates, based on the calculated ratios between the pressure and temperature acquired in the first period, the representative value of the ratios in the first period. FIG. 6 illustrates an example of a scatter diagram of temperature and pressure inside the tire 5 acquired in the first period. For example, the controller 34 uses the lowest ratio of the pressure to temperature from among the ratios between the pressure and temperature acquired in the first period, as the representative value of the ratios in the first period. The lowest ratio of the pressure to temperature is the minimum value of $R_{PT}$. In FIG. 6, a straight line with the smallest slope (a straight line with minimum $R_{PT}$) is illustrated from among the straight lines connecting the respective sets of acquisition data and the origin. The slope of this straight line is the representative value of the ratios in the first period. Calculating the representative value in this way is effective in situations where the temperature acquired by the acquisition device 2 is lower than the actual temperature inside the tire 5 due to the installation position of the acquisition device 2, such as when the acquisition device 2 is installed on the rim 6A of the wheel 6 which is cooled as a result of being in contact with the outside air while the vehicle 4 is running.

The method of calculating the representative value of the ratios in the first period is not limited to the foregoing method. For example, the controller 34 may set a statistical value based on values of a predetermined range in order from the lowest ratio of the pressure to temperature from among the ratios between the pressure and temperature acquired in the first period, as the representative value of the ratios in the first period. The statistical value is a value calculated by a statistical method, and examples thereof include mean, median, and mode. The predetermined range may be, for example, 10% of the total number of sets of acquisition data in the first period. The predetermined range is more preferably 5% of the total number of sets of acquisition data in the first period. By calculating the representative value in this way, a decrease in the accuracy of determining a pressure drop inside the tire 5 using the temperature inside the tire 5 can be prevented even in the case where the temperature acquired by the acquisition device 2 includes an extreme value.

The controller 34 may set a statistical value based on values of a predetermined range not including the lowest value in ascending order of the ratio of the pressure to temperature from among the ratios between the pressure and temperature acquired in the first period, as the representative value of the ratios in the first period. The predetermined range not including the lowest value may be, for example, the range from 5% to 20% of the total number of sets of acquisition data in ascending order of the ratio of the pressure to temperature. Specifically, in the case where the total number of sets of acquisition data is 100, the representative value of the ratios in the first period is calculated using the 5th to 20th values in ascending order of the ratio of the pressure to temperature. The predetermined range not including the lowest value is more preferably the range from 5% to 10% of the total number of sets of acquisition data in ascending order of the ratio of the pressure to temperature. By excluding the lowest value when calculating the representative value in this way, a decrease in the accuracy of determining a pressure drop inside the tire 5 using the temperature inside the tire 5 can be prevented even in the case where the temperature acquired by the acquisition device 2 includes an extreme value.

The controller 34 may calculate the representative value of the ratios in the first period using only each ratio that satisfies a predetermined condition from among the ratios between the pressure and temperature acquired in the first period. As an example, the controller 34 may calculate the representative value of the ratios in the first period based on each ratio corresponding to a temperature that does not exceed a predetermined temperature from among the ratios between the pressure and temperature inside the tire 5 acquired in the first period. Thus, a decrease in the accuracy of determining a pressure drop inside the tire 5 using the temperature inside the tire 5 can be prevented even in the case where the temperature acquired by the acquisition device 2 includes an abnormal value due to a malfunction of the temperature sensor 22 or the like. The predetermined temperature may be the upper limit of the expected endpoint temperature of the tire 5. The predetermined temperature is, for example, 80 degrees Celsius. Thus, for a typical tire 5 whose inside temperature does not exceed 80 degrees Celsius while the vehicle 4 is running, a decrease in the accuracy of determining a pressure drop inside the tire 5 using the temperature inside the tire 5 can be prevented, and the versatility of the tire state monitoring system 1 can be improved. If the temperature inside the tire 5 is expected to exceed 80 degrees Celsius, such as in the case of a racing tire, a predetermined temperature specific to the tire 5 may be set.

As another example, the controller 34 may set the ratio between the pressure and temperature at the lowest temperature from among the ratios between the pressure and temperature inside the tire 5 acquired in the first period, as the representative value of the ratios in the first period. The state in which the temperature inside the tire 5 is lowest can be regarded as the state in which the temperature inside the tire 5 is substantially equal to that of the outside air, such as a state in which time has passed after the vehicle 4 stopped. That is, the state in which the temperature inside the tire 5 is lowest can be regarded as the state in which the temperature acquired by the acquisition device 2 is not susceptible to the influence of the outside air. Thus, in the case where the temperature acquired by the acquisition device 2 is lower than the actual temperature inside the tire 5, a decrease in the accuracy of determining a pressure drop inside the tire 5 using the temperature inside the tire 5 can be prevented by a simple method.

Referring back to FIG. 5, in step S203, the controller 34 compares the ratio between the pressure and temperature inside the tire 5 acquired in the second period (current determination cycle) after the first period with the representative value of the ratios in the first period, to determine whether the pressure inside the tire 5 has dropped.

Specifically, the controller 34 calculates the ratio between the pressure and temperature inside the tire 5 received in step S201. The controller 34 stores the calculated ratio in the storage 33 as one of the ratios between the pressure and temperature inside the tire 5 in the second period. In the case where the calculated ratio is outside the range set based on the representative value of the ratios in the first period, the controller 34 determines that the pressure inside the tire 5 has dropped. In this embodiment, in the case where the acquired ratio is lower than the representative value of the ratios in the first period, the controller 34 determines that the pressure inside the tire 5 has dropped.

The controller 34 may determine that the pressure inside the tire 5 has dropped in the case where the ratio between the pressure and temperature inside the tire 5 acquired in the second period is outside the range based on the representative value of the ratios in the first period a plurality of times. The controller 34 can thus be prevented from erroneously determining that the pressure inside the tire 5 has dropped.

The controller 34 may determine whether the pressure inside the tire 5 has dropped only in the case where a predetermined condition is satisfied. For example, the controller 34 may determine whether the pressure inside the tire 5 has dropped in the case where the number of pairs of pressure and temperature inside the tire 5 acquired in the first period is greater than or equal to a predetermined number. The predetermined number is, for example, 100. The controller 34 can thus be prevented from erroneously determining that the pressure inside the tire 5 has dropped as a result of using the representative value of the ratios in the first period calculated based on an insufficient number of samples of acquisition data.

Alternatively, the controller 34 may determine whether the pressure inside the tire 5 has dropped in the case where the degree of scatter of the acquisition times of the pressure and temperature inside the tire 5 acquired in the first period is greater than a predetermined threshold. The controller 34 can thus be prevented from erroneously determining that the pressure inside the tire 5 has dropped as a result of using the representative value of the ratios in the first period calculated based on biased acquisition data. Specifically, the controller 34 determines whether the pressure inside the tire 5 has dropped in the case where there is a predetermined time difference between the oldest acquisition time and the latest acquisition time from among the acquisition times of the pressure and temperature inside the tire 5 acquired in the first period. The predetermined time difference is, for example, greater than or equal to half the length of the determination cycle. The degree of scatter of the acquisition times is not limited to this specific example, and may be a value calculated by a statistical method such as the variance or standard deviation of the acquisition times.

In the case where the controller 34 determines that the pressure inside the tire 5 has dropped in step S203 (step S203: Yes), in step S204, the controller 34 notifies that the pressure inside the tire 5 has dropped via the notification section 32. For example, the controller 34 causes the display to display notification that the pressure inside the tire 5 has dropped. This allows the user of the vehicle 4 to replace or overhaul the tire 5.

In the case where the controller 34 determines that the pressure inside the tire 5 has not dropped or the determination of whether the pressure inside the tire 5 has dropped is not made in step S203 (step S203: No), the controller 34 performs step S205. The controller 34 may notify that the pressure inside the tire 5 has not dropped via the notification section 32.

In step S205, the controller 34 determines whether to continue the present process.

Specifically, the controller 34 determines whether to continue the present process based on whether the current time has reached the end time of the current determination cycle. In the case where the current time has not reached the end time of the current determination cycle, the controller 34 determines to continue the present process (step S205: Yes), and repeats the process from step S101.

In the case where the current time has reached the end time of the current determination cycle, the controller 34 determines to end the present process (step S205: No), and ends the present process. After ending the present process, the controller 34 may start the present process in a new determination cycle.

As described above, a tire state monitoring system 1 according to an embodiment of the present disclosure comprises an acquisition device 2 and a control device 3. The acquisition device 2 is configured to repeatedly acquire the pressure and temperature inside a tire 5, and the control device 3 is configured to: calculate, based on ratios between the pressure and temperature acquired in a first period, a representative value of the ratios in the first period; and compare the ratio between the pressure and temperature acquired in a second period after the first period with the representative value, to determine whether the pressure inside the tire 5 has dropped. With such a structure, the control device 3 can improve the accuracy of determining a pressure drop inside the tire 5 using the temperature inside the tire 5 even in the case where the acquisition device 2 cannot accurately acquire the temperature inside the tire 5 due to, for example, the installation position of the acquisition device 2 on the tire 5 or the wheel 6.

Preferably, in the tire state monitoring system 1 according to an embodiment of the present disclosure, the control device 3 is configured to set the lowest ratio of the pressure to temperature from among the ratios between the pressure and temperature acquired in the first period, as the representative value. With such a structure, the accuracy of determining a pressure drop inside the tire 5 using the temperature inside the tire 5 can be further improved in the case where the temperature acquired by the acquisition device 2 is lower than the actual temperature inside the tire 5 due to the installation position of the acquisition device 2, such as when the acquisition device 2 is installed on the rim 6A of the wheel 6.

Preferably, in the tire state monitoring system 1 according to an embodiment of the present disclosure, the control device 3 is configured to set a statistical value based on values of a predetermined range in order from the lowest ratio of the pressure to temperature from among the ratios between the pressure and temperature acquired in the first period, as the representative value. With such a structure, a decrease in the accuracy of determining a pressure drop inside the tire 5 using the temperature inside the tire 5 can be prevented even when, in the case where the temperature acquired by the acquisition device 2 is lower than the actual temperature inside the tire 5, the temperature acquired by the acquisition device 2 includes an extreme value.

Preferably, in the tire state monitoring system 1 according to an embodiment of the present disclosure, the control device 3 is configured to set a statistical value based on values of a predetermined range not including the lowest value in ascending order of the ratio of the pressure to temperature from among the ratios between the pressure and temperature acquired in the first period, as the representative value. With such a structure, a decrease in the accuracy of determining a pressure drop inside the tire 5 using the temperature inside the tire 5 can be prevented even when, in the case where the temperature acquired by the acquisition device 2 is lower than the actual temperature inside the tire 5, the temperature acquired by the acquisition device 2 includes an extreme value.

Preferably, in the tire state monitoring system 1 according to an embodiment of the present disclosure, the control device 3 is configured to set the ratio between the pressure and temperature at the lowest temperature from among the ratios between the pressure and temperature acquired in the first period, as the representative value. With such a structure, in the case where the temperature acquired by the acquisition device 2 is lower than the actual temperature inside the tire 5, a decrease in the accuracy of determining a pressure drop inside the tire 5 using the temperature inside the tire 5 can be prevented by a simple method.

Preferably, in the tire state monitoring system 1 according to an embodiment of the present disclosure, the control device 3 is configured to determine whether the pressure inside the tire 5 has dropped, in the case where the number of pairs of the pressure and temperature acquired in the first period is greater than or equal to a predetermined number. With such a structure, the control device 3 can be prevented from erroneously determining that the pressure inside the tire 5 has dropped as a result of using the representative value of the ratios in the first period calculated based on an insufficient number of samples of acquisition data.

Preferably, in the tire state monitoring system 1 according to an embodiment of the present disclosure, the control device 3 is configured to determine whether the pressure inside the tire 5 has dropped, in the case where the degree of scatter of acquisition times of the pressure and temperature acquired in the first period is greater than a predetermined threshold. With such a structure, the control device 3 can be prevented from erroneously determining that the pressure inside the tire 5 has dropped as a result of using the representative value of the ratios in the first period calculated based on biased acquisition data.

Preferably, in the tire state monitoring system 1 according to an embodiment of the present disclosure, the control device 3 is configured to determine whether the pressure inside the tire 5 has dropped, in the case where there is a predetermined time difference between the oldest acquisition time and the latest acquisition time from among the acquisition times of the pressure and temperature acquired in the first period. With such a structure, the control device 3 can be prevented, by a simple method, from using the representative value of the ratios in the first period calculated based on biased acquisition data for the determination of a pressure drop inside the tire 5.

Preferably, in the tire state monitoring system 1 according to an embodiment of the present disclosure, the control device 3 is configured to calculate the representative value based on each ratio corresponding to a temperature that does not exceed a predetermined temperature from among the ratios between the pressure and temperature acquired in the first period. With such a structure, a decrease in the accuracy of determining a pressure drop inside the tire 5 using the temperature inside the tire 5 can be prevented even in the case where the temperature acquired by the acquisition device 2 includes an abnormal value.

Preferably, in the tire state monitoring system 1 according to an embodiment of the present disclosure, the predetermined temperature is 80 degrees Celsius. With such a structure, for a typical tire 5 whose inside temperature does not exceed 80 degrees Celsius while the vehicle 4 is running, a decrease in the accuracy of determining a pressure drop inside the tire 5 using the temperature inside the tire 5 can be prevented, and the versatility of the tire state monitoring system 1 can be improved.

Preferably, in the tire state monitoring system 1 according to an embodiment of the present disclosure, the control device 3 is configured to determine that the pressure inside the tire 5 has dropped, in the case where the ratio between the pressure and temperature acquired in the second period is outside a range based on the representative value a plurality of times. With such a structure, the control device

3 can be prevented from erroneously determining that the pressure inside the tire 5 has dropped.

A tire state monitoring method according to an embodiment of the present disclosure comprises: repeatedly acquiring a pressure and temperature inside a tire 5; calculating, based on ratios between the pressure and temperature acquired in a first period, a representative value of the ratios in the first period; and comparing the ratio between the pressure and temperature acquired in a second period after the first period with the representative value, to determine whether the pressure inside the tire 5 has dropped. With such a structure, the accuracy of determining a pressure drop inside the tire 5 using the temperature inside the tire 5 can be improved even in the case where the temperature inside the tire 5 cannot be accurately acquired.

While the presently disclosed techniques have been described above by way of embodiments and drawings, various changes and modifications can be made by those of ordinary skill in the art based on the present disclosure. Such changes and modifications are therefore included in the scope of the present disclosure. For example, the structures, functions, etc. included in each embodiment or example may be rearranged without logical inconsistency. The structures, functions, etc. included in each embodiment may be used in combination with another embodiment or example, and a plurality of structures, functions, etc. may be combined into one structure, function, etc., one structure, function, etc. may be divided into a plurality of structures, functions, etc., or part of the structures, functions, etc. may be omitted.

For example, all or part of the functions or processes described as the functions of the acquisition device 2 or the functions of the control device 3 in the foregoing embodiment may be implemented by a program. The program can be recorded in a computer-readable non-transitory recording medium. Examples of the computer-readable non-transitory recording medium include a magnetic recording device, an optical disc, a magneto-optical recording medium, and semiconductor memory. The program is distributed, for example, by selling, transferring, or renting a portable recording medium having the program recorded therein, such as a digital versatile disc (DVD) or a compact disc read only memory (CD-ROM). Alternatively, the program may be stored in a storage of a certain server and transferred from the certain server to another computer to distribute the program. The program may be provided as a program product.

For example, the processor in the acquisition device 2 or the control device 3 once stores, in memory, the program recorded in the portable recording medium or the program transferred from the certain server, and then reads the program stored in the memory and executes processes according to the read program. The program includes information that is to be processed by a processor and is equivalent to a program. For example, data that is not a direct command to the processor but has the property of defining the processes of the processor is "equivalent to a program".

Alternatively, all or part of the functions or processes described as the functions or processes of the control device 3 in the foregoing embodiment may be implemented as the functions or processes of the acquisition device 2. In such a case, a program describing the functions or processes of the control device 3 according to the embodiment may be stored in, for example, memory in the acquisition device 2, and read and executed by, for example, the processor in the acquisition device 2. Likewise, all or part of the functions or processes described as the functions or processes of the acquisition device 2 may be implemented as the functions or processes of the control device 3.

Although the foregoing embodiment describes the case where the acquisition device 2 is installed on the rim 6A of the wheel 6 of the vehicle 4, the present disclosure is not limited to such. For example, the acquisition device 2 may be installed at any position of the tire 5 or the wheel 6, such as inside the tire 5 of the vehicle 4, or at the valve of the tire 5.

Although the foregoing embodiment describes the case where the control device 3 is installed in the vehicle body 4A of the vehicle 4, the present disclosure is not limited to such. For example, the control device 3 may be installed in the tire 5 or the wheel 6 of the vehicle 4, as with the acquisition device 2. Alternatively, the control device 3 may be installed outside the vehicle 4, and the functions or processes of the control device 3 may be provided to the user as a service such as SaaS (Software as a Service). In such a case, instead of notifying that the pressure inside the tire 5 has dropped via the notification section 32, the control device 3 may communicate with a computer such as a smartphone owned by the user via the communication section 31 and notify that the pressure inside the tire 5 has dropped by the computer.

Although the foregoing embodiment describes the case where the ratio between pressure and temperature is the ratio of pressure to temperature, the present disclosure is not limited to such. The ratio between pressure and temperature may be the ratio of temperature to pressure, and may be represented by the following formula (3):

$$R_{TP}=T/P \qquad \text{formula (3)}$$

where $R_{TP}$ is the ratio between pressure and temperature (ratio of temperature to pressure), P is the absolute pressure (gauge pressure+100 kPa), and T is the absolute temperature (Celsius+273° C.).

In such a case, the lowest ratio of the pressure to temperature in the foregoing embodiment is the maximum value of $R_{TP}$. For example, the controller 34 in the control device 3 may determine that the pressure inside the tire 5 has dropped in the case where the ratio $R_{TP}$ between the pressure and temperature acquired in the second period is higher than the representative value of the ratios $R_{TP}$ in the first period.

REFERENCE SIGNS LIST 1 tire state monitoring system
2 acquisition device
21 pressure sensor
22 temperature sensor
23 communication section
24 storage
25 controller
3 control device
31 communication section
32 notification section
33 storage
34 controller
4 vehicle
4A vehicle body
5 tire
6 wheel
6A rim

The invention claimed is:

1. A tire state monitoring system comprising an acquisition device and a control device, wherein the acquisition device comprises a pressure sensor, a temperature sensor, and a first communication module;

the acquisition device is configured to repeatedly acquire, by the pressure sensor, a pressure inside a tire, acquire, by the temperature sensor, temperature inside the tire, and transmit, by the communication module, data including the pressure and the temperature inside the tire, the control device comprises a second communication module, the control device is configured to:

repeatedly receive, by the second communication module, the data including the pressure and the temperature inside the tire;

calculate, based on ratios between the pressure and temperature acquired in a first period, a representative value of the ratios in the first period;

compare a ratio between the pressure and temperature acquired in a second period after the first period with the representative value, to determine whether the pressure inside the tire has dropped; and communicate with a computer by the second communication module to cause the computer to notify that the pressure inside the tire has dropped;

wherein the control device is configured to set, as the representative value, one of:

a lowest ratio of the pressure to temperature from among the ratios between the pressure and temperature acquired in the first period, a statistical value based on values of a predetermined range in order from a lowest ratio of the pressure to the temperature from among the ratios between the pressure and temperature acquired in the first period, a statistical value based on values of a predetermined range not including a lowest value in ascending order of a ratio of the pressure to temperature from among the ratios between the pressure and temperature acquired in the first period, or a ratio between the pressure and temperature at a lowest temperature from among the ratios between the pressure and temperature acquired in the first period.

2. The tire state monitoring system according to claim 1, wherein the control device is configured to set the lowest ratio of the pressure to temperature from among the ratios between the pressure and temperature acquired in the first period, as the representative value.

3. The tire state monitoring system according to claim 2, wherein the control device is configured to determine whether the pressure inside the tire has dropped, in a case where a number of pairs of the pressure and temperature acquired in the first period is greater than or equal to a predetermined number.

4. The tire state monitoring system according to claim 2, wherein the control device is configured to determine whether the pressure inside the tire has dropped, in a case where a degree of scatter of acquisition times of the pressure and temperature acquired in the first period is greater than a predetermined threshold.

5. The tire state monitoring system according to claim 2, wherein the control device is configured to calculate the representative value based on each ratio corresponding to a temperature that does not exceed a predetermined temperature from among the ratios between the pressure and temperature acquired in the first period.

6. The tire state monitoring system according to claim 2, wherein the control device is configured to determine that the pressure inside the tire has dropped, in a case where the ratio between the pressure and temperature acquired in the second period is outside a range based on the representative value a plurality of times.

7. The tire state monitoring system according to claim 1, wherein the control device is configured to set the statistical value based on the values of the predetermined range in order from the lowest ratio of the pressure to temperature from among the ratios between the pressure and temperature acquired in the first period, as the representative value.

8. The tire state monitoring system according to claim 7, wherein the control device is configured to determine whether the pressure inside the tire has dropped, in a case where a number of pairs of the pressure and temperature acquired in the first period is greater than or equal to a predetermined number.

9. The tire state monitoring system according to claim 7, wherein the control device is configured to determine whether the pressure inside the tire has dropped, in a case where a degree of scatter of acquisition times of the pressure and temperature acquired in the first period is greater than a predetermined threshold.

10. The tire state monitoring system according to claim 7, wherein the control device is configured to calculate the representative value based on each ratio corresponding to a temperature that does not exceed a predetermined temperature from among the ratios between the pressure and temperature acquired in the first period.

11. The tire state monitoring system according to claim 7, wherein the control device is configured to determine that the pressure inside the tire has dropped, in a case where the ratio between the pressure and temperature acquired in the second period is outside a range based on the representative value a plurality of times.

12. The tire state monitoring system according to claim 1, wherein the control device is configured to set the statistical value based on values of the predetermined range not including the lowest value in ascending order of the ratio of the pressure to temperature from among the ratios between the pressure and temperature acquired in the first period, as the representative value.

13. The tire state monitoring system according to claim 1, wherein the control device is configured to set the ratio between the pressure and temperature at the lowest temperature from among the ratios between the pressure and temperature acquired in the first period, as the representative value.

14. The tire state monitoring system according to claim 1, wherein the control device is configured to determine whether the pressure inside the tire has dropped, in a case where a number of pairs of the pressure and temperature acquired in the first period is greater than or equal to a predetermined number.

15. The tire state monitoring system according to claim 1, wherein the control device is configured to determine whether the pressure inside the tire has dropped, in a case where a degree of scatter of acquisition times of the pressure and temperature acquired in the first period is greater than a predetermined threshold.

16. The tire state monitoring system according to claim 15, wherein the control device is configured to determine whether the pressure inside the tire has dropped, in a case where there is a predetermined time difference between an oldest acquisition time and a latest acquisition time from among the acquisition times of the pressure and temperature acquired in the first period.

17. The tire state monitoring system according to claim 1, wherein the control device is configured to calculate the representative value based on each ratio corresponding to a temperature that does not exceed a predetermined temperature from among the ratios between the pressure and temperature acquired in the first period.

18. The tire state monitoring system according to claim 17, wherein the predetermined temperature is 80 degrees Celsius.

19. The tire state monitoring system according to claim 1, wherein the control device is configured to determine that the pressure inside the tire has dropped, in a case where the ratio between the pressure and temperature acquired in the second period is outside a range based on the representative value a plurality of times.

20. A tire state monitoring method executed by a tire state monitoring system comprising an acquisition device and a control device, wherein the acquisition device comprises a pressure sensor, a temperature sensor, and a first communication module; and wherein the control device comprises a second communication module, the method comprising:

repeatedly acquiring, by the acquisition device via the pressure sensor, a pressure inside a tire and acquiring, by the acquisition device via the temperature sensor, a temperature inside the tire, and transmitting, by the acquisition device via the communication module, data including the pressure and the temperature inside the tire;

repeatedly receiving, by the control device via the second communication module, the data including the pressure and the temperature inside the tire;

calculating, by the control device, based on ratios between the pressure and temperature acquired in a first period, a representative value of the ratios in the first period;

comparing, by the control device, a ratio between the pressure and temperature acquired in a second period after the first period with the representative value, to determine whether the pressure inside the tire has dropped; and communicating, by the control device with a computer via the second communication module, to cause the computer to notify that the pressure inside the tire has dropped;

wherein the method further comprises setting by the control device, as the representative value, one of:

a lowest ratio of the pressure to temperature from among the ratios between the pressure and temperature acquired in the first period, a statistical value based on values of a predetermined range in order from a lowest ratio of the pressure to the temperature from among the ratios between the pressure and temperature acquired in the first period, a statistical value based on values of a predetermined range not including a lowest value in ascending order of a ratio of the pressure to temperature from among the ratios between the pressure and temperature acquired in the first period, or a ratio between the pressure and temperature at a lowest temperature from among the ratios between the pressure and temperature acquired in the first period.

* * * * *